April 21, 1936.    L. GOLDHAMMER    2,038,037

PHOTOGRAPHIC CAMERA

Filed Oct. 23, 1934

Inventor:
Leo Goldhammer,
By Attorney
Philip S. Hopkins.

Patented Apr. 21, 1936

2,038,037

UNITED STATES PATENT OFFICE 2,038,037

PHOTOGRAPHIC CAMERA

Leo Goldhammer, Munich, Germany, assignor to Agfa Ansco Corporation, Binghamton, N. Y., a corporation of New York Application October 23, 1934, Serial No. 749,632
In Germany October 25, 1933

2 Claims. (Cl. 95—53)

My present invention relates to a photographic camera.

When photographs are taken at night or by flashlight it frequently happens that the operator forgets to close the shutter after the exposure. An object of this invention is to provide a camera constructed in which this accident is avoided by a device which determines the closing of the shutter when the camera is closed.

Figure 1:
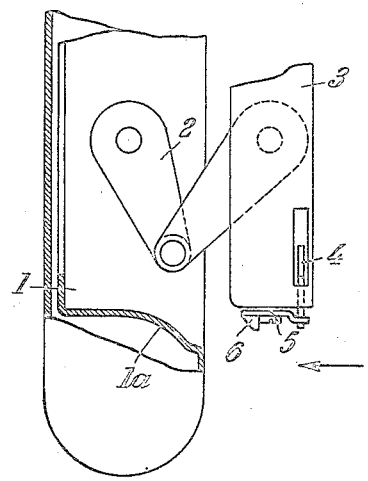
Figure 2:
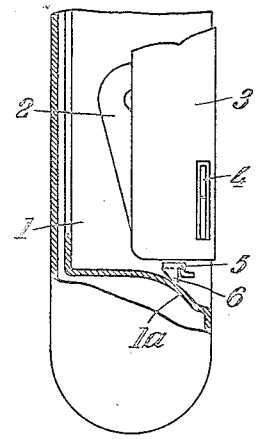
Figure 3:
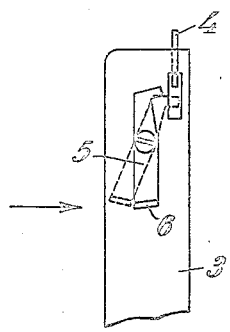

The accompanying drawing illustrates the invention:

Fig. 1 is a side view, partly in section, of the lower part of the camera in half-closed position, Fig. 2 is the same side view with the lens panel thrust home, Fig. 3 is an underside plan of the lens panel.

The camera casing 1 is connected with the lens panel by the toggle joint 2. The laterally projecting lever for releasing the shutter is indicated by 4. The shutter is opened by pressing lever 4, which can then be held in position by the lever 5. If, after the exposure, the operator should forget to turn the lever 5, on the camera being closed the bevel end 6 of the lever will engage the inclined surface 1a of the casing 1, whereby the lever 5 is turned into the position indicated by full lines in Fig. 3, the lever 4 is freed and therefore the shutter is closed.

What I claim is:

1. In a photographic camera in combination, a casing, an objective panel, means for connecting said objective panel with said casing, a shutter mounted in said panel, a lever for releasing said shutter, means on said panel for locking said shutter release lever when said shutter is opened, and means on said objective panel for releasing said shutter release lever when closing the camera.

2. In a photographic camera in combination, a casing, an objective panel, means for connecting said objective panel with said casing, a shutter mounted in said panel, a lever for releasing said shutter, a lever pivotally mounted on said panel for locking said shutter release lever when said shutter is opened, and an inclined surface on said camera casing co-operating with said lever on said panel for releasing said shutter release lever when closing the camera.

LEO GOLDHAMMER.